United States Patent [19]
Krahn et al.

[11] Patent Number: 5,802,910
[45] Date of Patent: Sep. 8, 1998

[54] MEASURING SYSTEM FOR LIQUID VOLUMES AND LIQUID LEVELS OF ANY TYPE

[76] Inventors: Heinrich Krahn, Schönfelderstrasse 4, D-34225 Baunatal 5; Adolf Günther, Waldstrasse 5, D-34466 Wolfhagen; Werner Weindl, Max. Plank-Strasse 11, D-34225 Baunatal 1, all of Germany

[21] Appl. No.: 765,042

[22] PCT Filed: Apr. 11, 1996

[86] PCT No.: PCT/IB96/00318

§ 371 Date: Dec. 10, 1996

§ 102(e) Date: Dec. 10, 1996

[87] PCT Pub. No.: WO96/33392

PCT Pub. Date: Oct. 24, 1996

[30] Foreign Application Priority Data

Apr. 15, 1995 [DE] Germany .................. 195 14 201.1

[51] Int. Cl.⁶ .................. G08B 21/00; E21B 47/04; G01F 23/18
[52] U.S. Cl. .................. 73/299; 73/290 R; 73/301; 73/861.49; 73/861.42; 340/618
[58] Field of Search .................. 73/301, 299, 290 R, 73/291, 861.49, 861.42, 861.46; 340/618

[56] References Cited

U.S. PATENT DOCUMENTS

| | | | |
|---|---|---|---|
| 3,769,841 | 11/1973 | Thulin | 73/425.4 P |
| 4,368,639 | 1/1983 | Owens | 73/301 |
| 4,570,484 | 2/1986 | Sokalski | 73/301 |
| 4,639,738 | 1/1987 | Young et al. | 346/75 |
| 4,669,309 | 6/1987 | Cornelius | 73/299 |
| 4,791,814 | 12/1988 | Nee | 73/49.2 |
| 4,835,991 | 6/1989 | Knoop et al. | 68/12 R |
| 4,972,705 | 11/1990 | Fryer et al. | 73/155 |
| 5,059,954 | 10/1991 | Beldham et al. | 340/614 |
| 5,146,783 | 9/1992 | Jansche et al. | 73/301 |
| 5,347,863 | 9/1994 | Richard | 73/301 |

FOREIGN PATENT DOCUMENTS

| | | |
|---|---|---|
| 8221387.9 | 11/1982 | Germany . |
| 3728042A1 | 3/1989 | Germany . |
| 4112559A1 | 10/1992 | Germany . |

Primary Examiner—Hezron E. Williams
Assistant Examiner—J. David Wiggins
Attorney, Agent, or Firm—Michael J. Striker

[57] ABSTRACT

The apparatus measures the liquid volume of a liquid or liquids held in one or more containers. This apparatus has no moving parts and includes an open-ended dynamic pressure tube standing in each container with its open tube end at the lowest point of the container on the bottom surface of it and a pressure measurement converter closing the other tube end so as to form an air column between the pressure measurement converter and a liquid level in it. The apparatus also includes an electronic analyzing device (3,4) including an electronic circuit (3) connected electrically to the pressure measurement converter and producing an electronic signal characteristic of a liquid volume in the container and a digital meter for displaying a volume reading.

8 Claims, 2 Drawing Sheets

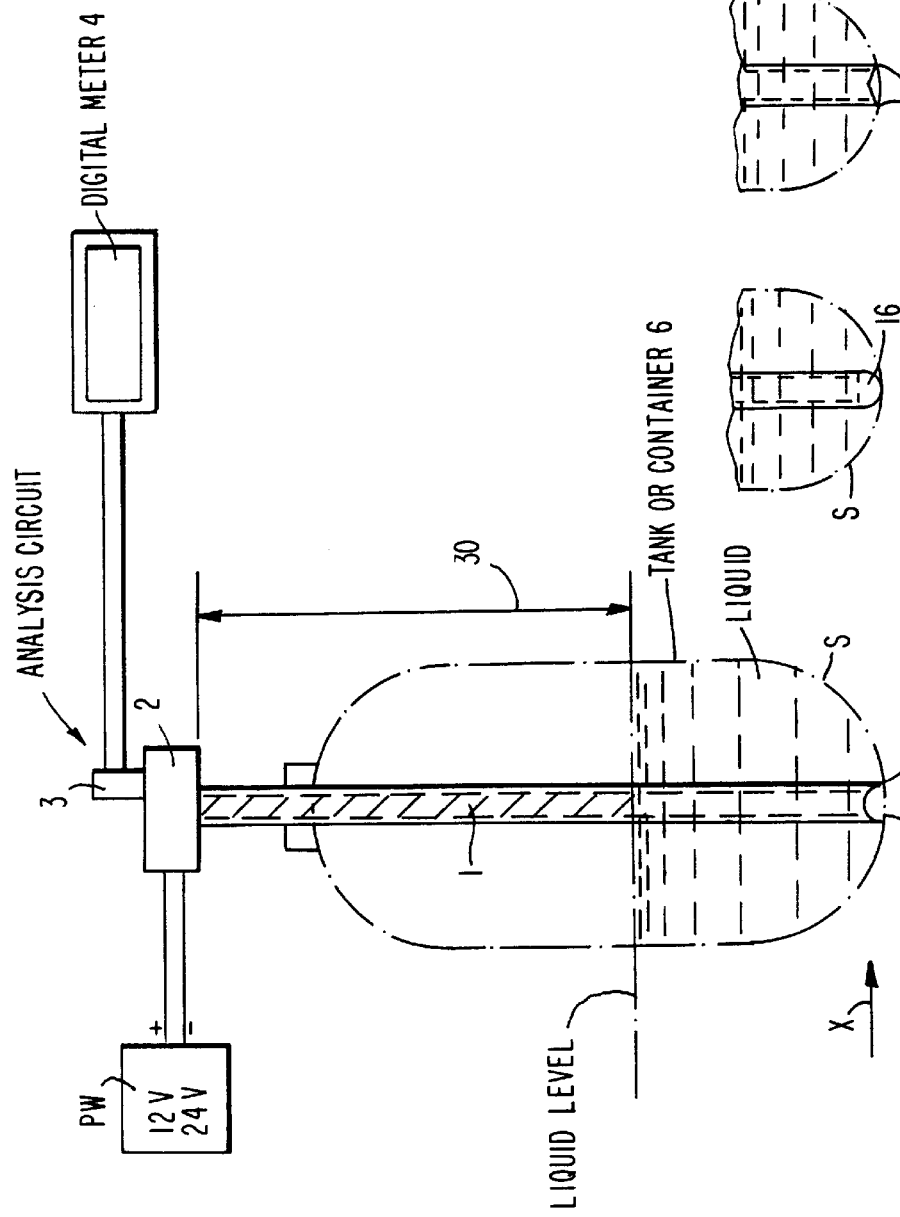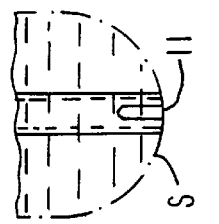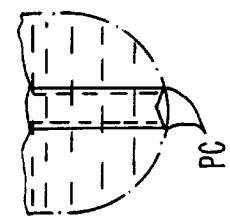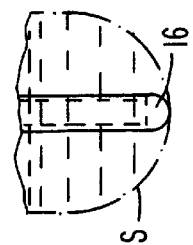

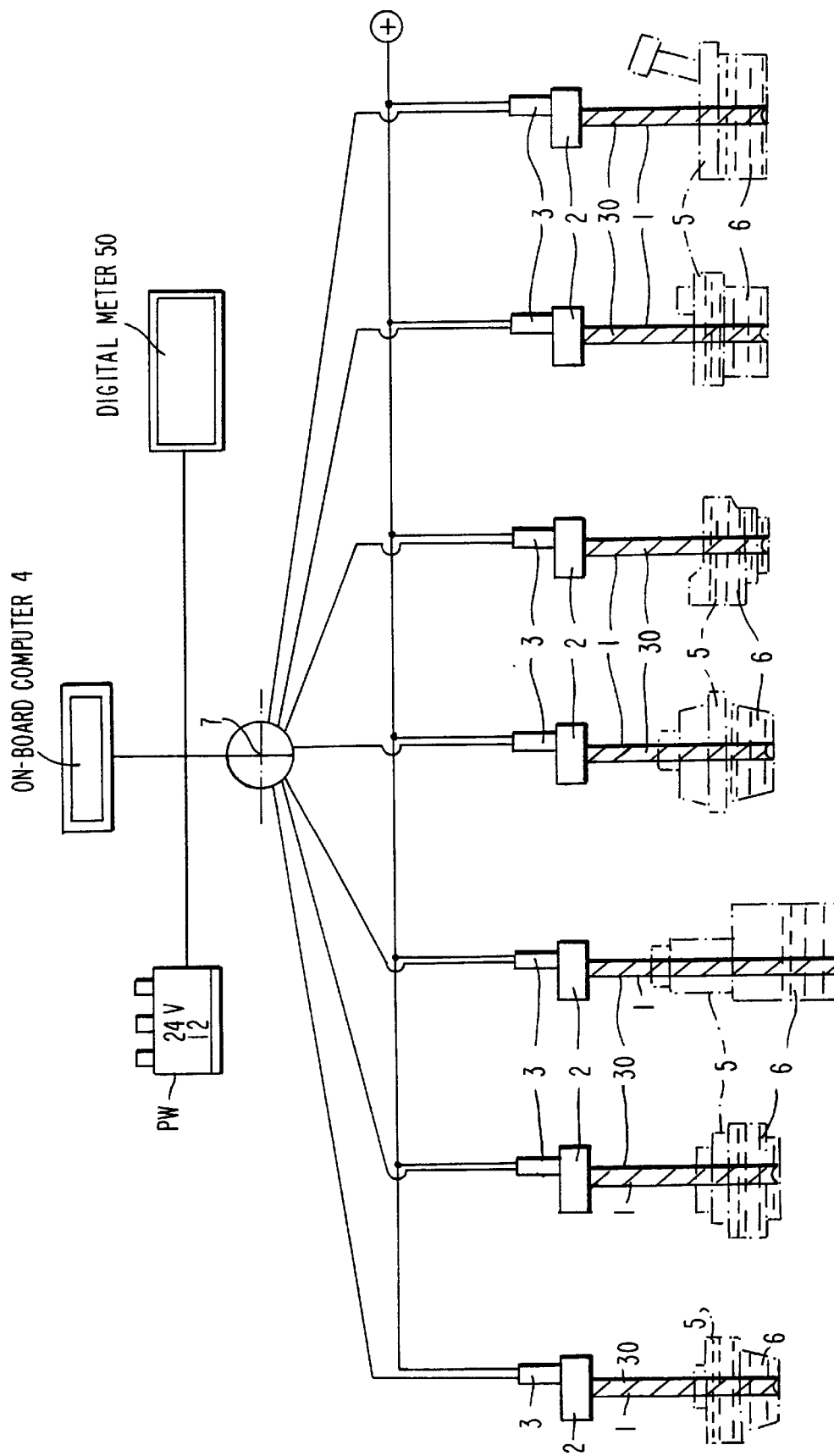

5,802,910

MEASURING SYSTEM FOR LIQUID VOLUMES AND LIQUID LEVELS OF ANY TYPE

BACKGROUND OF THE INVENTION

The subject of the invention is a measuring system, which measures liquid levels of various media in order to measure the liquid volume in containers of all sizes and types, for instance, in order to be able to monitor the volume of media, such as oil, water and fuel, in tanks and coolant in the hollow spaces of engines of all kinds.

The stated object relates to monitoring systems for testing and measuring by simple means without mechanically moving parts, in order to measure and evaluate volumes within seconds, so as to guarantee a reliable operation of all operating devices preferably in a vehicle or in a plant. All the known measurement systems work with mechanically moving parts such as floats and levers.

If not precisely, as in checking engine oil in a motor vehicle, the oil level monitoring is tested with an oil dipstick with calibrated markings thereon in order to be able to detect the oil level by visual comparison with the markings.

In another known level gauge, a float supported by the liquid is connected by a pointer to a level, so as to generate the measurement signals as it moves back and forth. Other fill gauges exist for fuel tanks of vehicles, where a pressure sensor is located near the tank bottom and a measurement site is located at a second point, so that via the pressure difference the fill quantity in the tank can be determined. See German Patent Application DE 37 28 042 Al.

Other measuring methods for liquid containers exist that perform measurements with hydrostatic fill gauges. A tank level transducer that operates by the hydrostatic principle has a differential pressure sensor, which is connected by two measurement inputs and one measurement output to an evaluation unit with an indicator device. See German Patent Application DE 41 12 559 Al.

Other measuring methods include oil level monitors with a hollow dipstick, for instance.

When a test key is actuated, the engine oil is aspirated via a pump, and the oil column in the dipstick is measured with an end feeler. The end switch turns the pump off and via reporting means transmits signals that indicate whether the oil level is acceptable.

This measuring method is very complicated and expensive, as illustrated by German Utility Model G 62 21 367.9.

SUMMARY OF THE INVENTION

It is an object of the present invention to provide a measuring system for liquid volumes and liquid levels which does not have the above-described disadvantages.

It is another object of the present invention to provide a measuring system for liquid volumes and liquid levels which is comparatively simple and does not have moving parts.

Accordingly, a very simple apparatus according to the invention comprises an innermost tube disposed in a tank, container or housing, which can constantly measure the volume of oil or other operating media in order to evaluate or refill them.

According to the invention the apparatus for measuring liquid volume of liquid held in a container having a lowest point has no moving parts and comprises a dynamic pressure tube having an open tube end standing in the container at its lowest point, the open tube end being shaped so that only some, but not all, points on the open tube end rest on the container bottom surface so that the liquid can flow into and out of the dynamic pressure tube through the open tube end; a pressure measurement converter closing another end of the dynamic pressure tube opposite from the open tube end so as to form an air column between the pressure measurement converter and a liquid level in the dynamic pressure tube; and an electronic analyzing device comprising an electronic circuit mounted on the pressure measurement converter and connected electrically to the pressure measurement converter, the electronic circuit including means for producing an electronic signal characteristic of a liquid volume in the container, as well as, preferably, a digital meter connected with the electronic circuit for display of the measured liquid volume.

In a preferred embodiment of the invention the liquid volumes in a plurality of containers are measured by open-ended dynamic pressure tubes standing in the respective containers, each of which is closed by a pressure measurement converter with an associated electronic circuit producing a signal characteristic of the liquid volume. In this embodiment a digital meter and selector switch connected to it and the pressure measurement converters are provided, so that the pressure measurement converters and electronic circuits can be connected one-at-a-time to the digital meter to the liquid volume measured by the connected measurement converter.

The measuring system of the invention for liquid volumes and liquid levels has the advantage over the known prior art that it can be furnished especially simply and economically. No mechanically moving parts are present in it, so that the measuring equipment is especially secure against malfunction and has a long life.

Moreover, the measuring equipment measures very accurately, regardless of the structural shape of a container or the fill levels of oil inside various bodies.

Various mechanical parts such as the float technology components etc. in motor vehicles used for the current status tests are thereby eliminated with attendant savings.

BRIEF DESCRIPTION OF THE DRAWINGS

The objects, features and advantages of the invention will now be illustrated in more detail with the aid of the following description of the preferred embodiments, with reference to the accompanying figures in which:

FIG. 1 is a diagrammatic cross-sectional view of a first embodiment of an apparatus for measuring liquid volume in a container according to the invention;

FIG. 2 is a cutaway side view of the apparatus shown in FIG. 1 seen in the direction X in FIG. 1;

FIGS. 3 and 4 are cutaway side views of different embodiments of the apparatus of FIG. 1 seen in the direction X similar to FIG. 2; and FIG. 5 is a diagrammatic view of an apparatus for measuring fluid levels in a motor vehicle according to the invention.

DESCRIPTION OF THE PREFERRED EMBODIMENTS

All the measurement sites in each embodiment in FIGS. 1 to 5 are each provided with one dynamic pressure tube 1 having an open tube end O and standing in a container or housing cavity 6 containing liquid whose liquid volume is to be measured. The dynamic pressure tube 1 is arranged in the container 6 so that its open tube end O stands at a lowest point 11 of the container 6.

Located on the upper end of the dynamic pressure tube 1 is a two-lead pressure measurement converter 2, located outside the liquid to be measured, connected electrically with an electronic analyzing device 3,4. The two leads +,- for the converter 2 are seen in FIG. 1 running from the power supply PW. The electronic analyzing device includes an electronic circuit 3 mounted directly on the dynamic pressure tube 1 which produces an electronic signal characteristic of a liquid volume in the container or housing cavity 6. This electronic signal is transmitted to a remotely connected built-in instrument, such as a digital meter or on-board computer 4.

The individual measurement sites, i.e. the electronic circuits 3, in the embodiment shown in FIG. 5 are electrically connected to a selector switch 7. The individual volume signals from the corresponding measuring site can be selected and transmitted to the on-board computer or built-in instrument 4 via the selector switch.

In addition in FIG. 5, each two-lead pressure measurement converter 1 is connected via the selector switch 7 to another digital built-in instrument 50 which can be a digital meter. All the signals from the measuring sites are input to the digital built-in instrument for display purposes.

What is measured is the pressure in air column 30 that is located between the liquid level L in the dynamic pressure tube 1 and the two-lead pressure measurement converter 2 having the connected electronic circuit 3.

The embodiment shown in FIG. 5 is an apparatus according to the invention for measuring liquid levels at a plurality of measuring sites 15, 25, 35, 45, 55, 65, 75 in a motor vehicle. These measurement sites are as follows: coolant level measurement site 15, engine oil level measurement site 25, power steering fluid level measurement site 35, brake fluid level measurement site 45, transmission oil level measurement site 55, windshield washer fluid level measurement site 65 and fuel tank level measurement site 75. Every measurement site has a dynamic pressure tube with its open tube end immersed in the liquid volume being measured. Seven of them are shown in FIG. 5; others may be added. Located at the upper end of the dynamic pressure tube 1 at each measurement site in the embodiment of FIG. 5 is a two-lead pressure measurement converter with electronics that functions by dynamic pressure technology principles. The structural form of the two-lead pressure measurement converter 2 including the associated electronic circuit 3 is very small and is therefore highly versatile in use for all liquids. In all liquids, the volume can be ascertained via the level. The individual data to be measured may be selected via the selector switch and, once the ascertained values are simultaneously made known, can be acquired or processed via the built-in instrument or on-board computer 4.

The lower open tube end O of the dynamic pressure tube 1, which is immersed in the liquid, is seated on the bottom surface S at the lowest point 11 in the interior of a housing or tank-type container 6. The tubular annular surface 15 at the open end O is shaped in the form of a semicircle 16 such that only some points PC of the open tube end O contact the container bottom surface at the lowest point 11 in the interior of a filled tank or functional body, such as an engine or transmission.

The varying liquid in the volume accordingly changes the pressure in air column 30 and the pressure change in the air column, measured in millibars, when converted, indicates the volume change.

In operation, the liquid level in a container or tank 6 of an action element 5, such as an engine or transmission, has the same height in the dynamic pressure tube 1 standing in the liquid.

The air column 30, that is located between the liquid level in the dynamic pressure tube 1 and the two-lead pressure measurement converter 2, varies in accordance with use or leakage, so that any pressure difference is detected by the two-lead pressure measurement converter and is converted by the electronics into a signal which is transmitted via the selector switch 7 to the units 4,50 for analysis and display.

If a dynamic pressure tube 1 is now installed from above in a container 6, such as a tank or transmission, so that the lower open end of the tube stands in container 6 with the points 15 at its lowermost end, then the windshield washer system, brake fluid, power steering fluid, engine oil level, fuel and transmission oil level in a motor vehicle, coolant in the radiator and engine, tanks for household heaters, and auxiliary equipment in the automobile can be monitored continuously.

The individual measurement applications in the embodiment of FIG. 5 are indicated at reference numerals 55, 45, 65, 35, 15, 25 and 75.

We claim:

1. An apparatus with a single measurement tube for measuring liquid volume of liquid held in a container having a lowest point, said apparatus having no moving parts and comprising:

a dynamic pressure tube (1) having an open tube end (O), wherein said dynamic pressure tube (1) stands in said container (6) with said open tube end (O) at said lowest point (11) of said container and said open tube end (O) is shaped so that only some, but not all, points (PC) on said open tube end (O) rest on a bottom surface (S) of said container at said lowest point (11), so that said liquid can flow into and out of said dynamic pressure tube (1) until an equilibrium liquid level (L) is attained;

a pressure measurement converter (2) closing another end of said dynamic pressure tube (1) opposite from said open tube end (O) so as to form an air column (30) between the pressure measurement converter (2) and a liquid level (L) in said dynamic pressure tube (1); and an electronic analyzing device (3,4) comprising an electronic circuit (3) mounted on the pressure measurement converter (2) and connected electrically to said pressure measurement converter (2), said electronic circuit (3) including means responsive to said pressure measurement converter for producing an electronic signal characteristic of the liquid volume in the container (6).

2. The apparatus as defined in claim 1, wherein said electronic analyzing device (3,4) comprises a digital meter (4, 50) for displaying a liquid volume reading connected to said electronic circuit (3).

3. The apparatus as defined in claim 1, wherein said dynamic pressure tube (1) is made of plastic, glass or metal.

4. The apparatus as defined in claim 1, wherein said container (6) comprises a plastic material, a glass material or a metal.

5. An apparatus for measuring liquid volumes of liquid in each of a plurality of different containers, each of said containers (6) having a lowest point (11) and a single measurement tube inserted therein, said apparatus having no moving parts and comprising:

a dynamic pressure tube (1) having an open tube end (O) standing in each of said containers with said open tube end (O) at said lowest point (11) and said open tube end (O) is shaped so that only some, but not all, points (PC) on said open tube end (O) rest on a bottom surface (S) of said container so that said liquid can flow into and out of said dynamic pressure tube (1) until an equilibrium liquid level (L) is attained;

a pressure measurement converter (2) closing another end of each of said dynamic pressure tubes (1) opposite from said open tube end (O) so as to form an air column (30) between each of the pressure measurement converters (2) and a liquid level (L) in said dynamic pressure tube (1) closed thereby;

an electronic analyzing device (3,4) comprising an electronic circuit (3) mounted on each of said pressure measurement converters and connected electrically to each of said pressure measurement converters (2), said electronic circuit including means responsive to said pressure measurement converter for producing an electronic signal characteristic of said liquid volume measured by said pressure measurement converter (2), and said electronic analyzing device (3,4) includes a digital meter (50) for displaying a liquid volume reading, said digital meter (50) being located remotely from said electronic circuits; and a selector switch (7) connected electrically to each of said electronic circuits (3) of said pressure measurement converters (2) and to said digital meter (4,50), said selector switch (7) including means for selecting one of said pressure measurement converters and connecting only the selected one of said pressure measurement converters to said digital meter (4,50), so that said digital meter displays the liquid volume measured by the selected one of said pressure measurement converters.

6. The apparatus as defined in claim 5, wherein said dynamic pressure tubes (1) are made of plastic, glass or metal.

7. The apparatus as defined in claim 5, wherein said container (6) comprises a plastic material, a glass material or a metal.

8. The apparatus as defined in claim 5, wherein said different containers (6) include a radiator, windshield washer system/tank, engine coolant compartment, brake fluid tank, engine oil reservoir, transmission and fuel tank of a motor vehicle.

* * * * *